Figure 1:
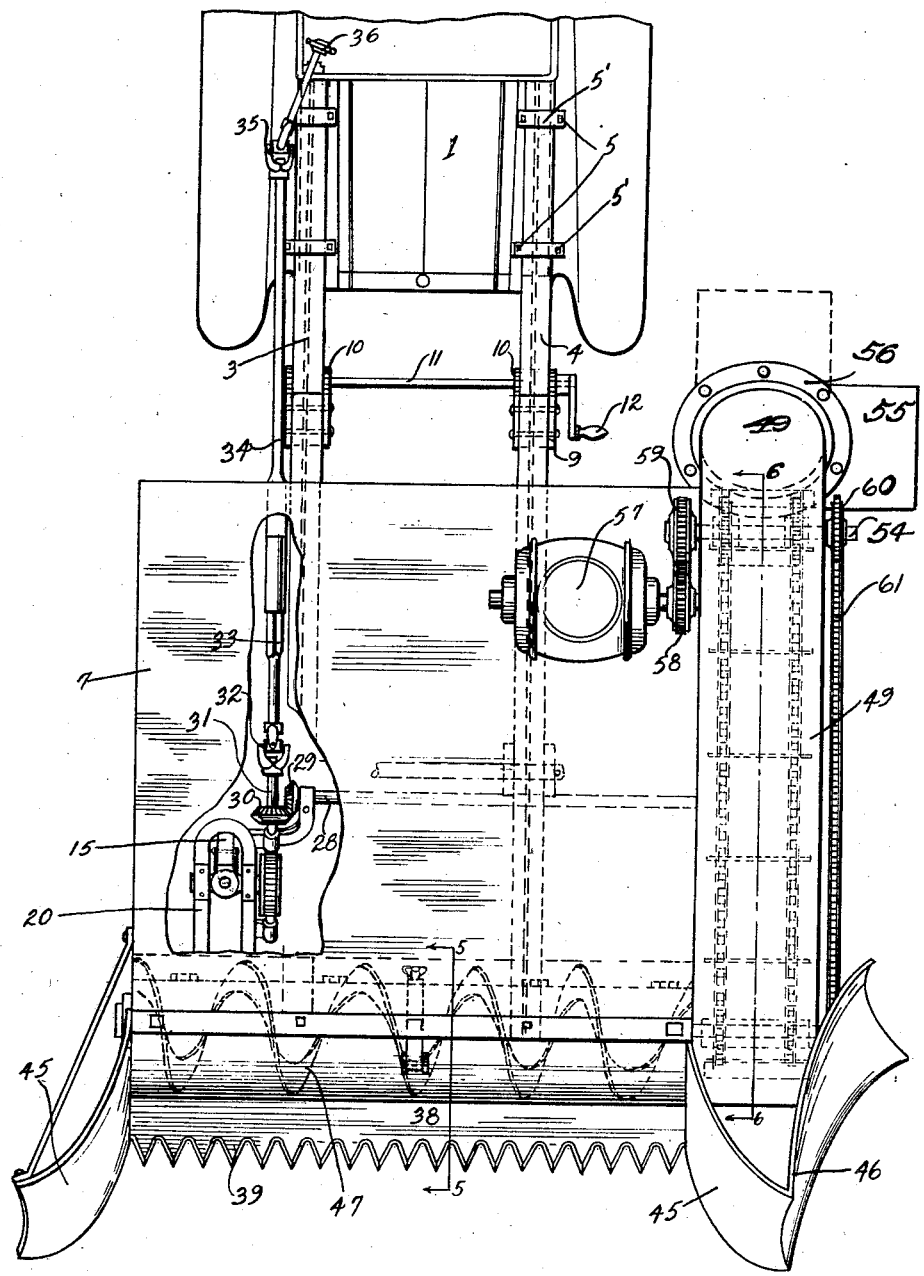

March 29, 1932.  G. W. BUNNELL  1,851,301
SNOW REMOVER
Filed March 25, 1929  2 Sheets-Sheet 1

George W. Bunnell, Inventor

By Herbert E. Smith
Attorney

March 29, 1932.  G. W. BUNNELL  1,851,301
SNOW REMOVER
Filed March 25, 1929   2 Sheets-Sheet 2
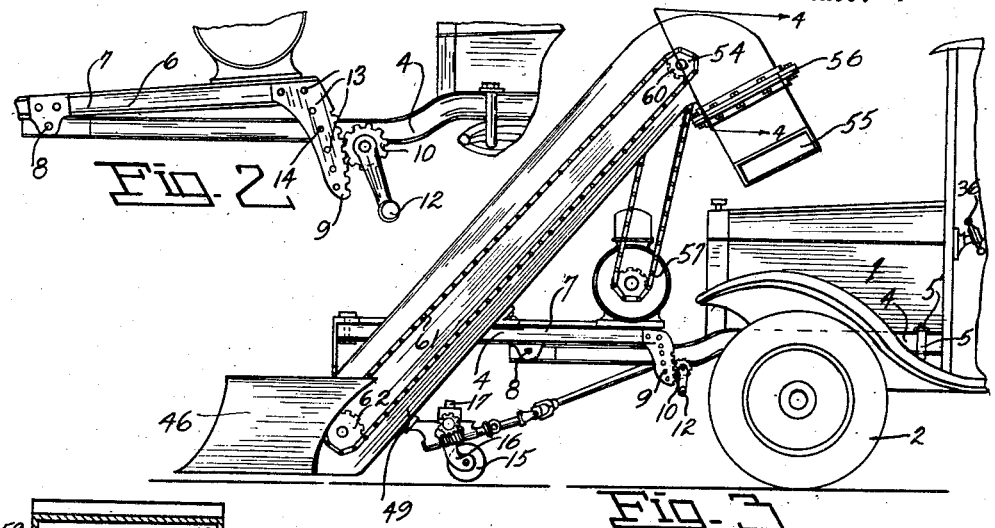
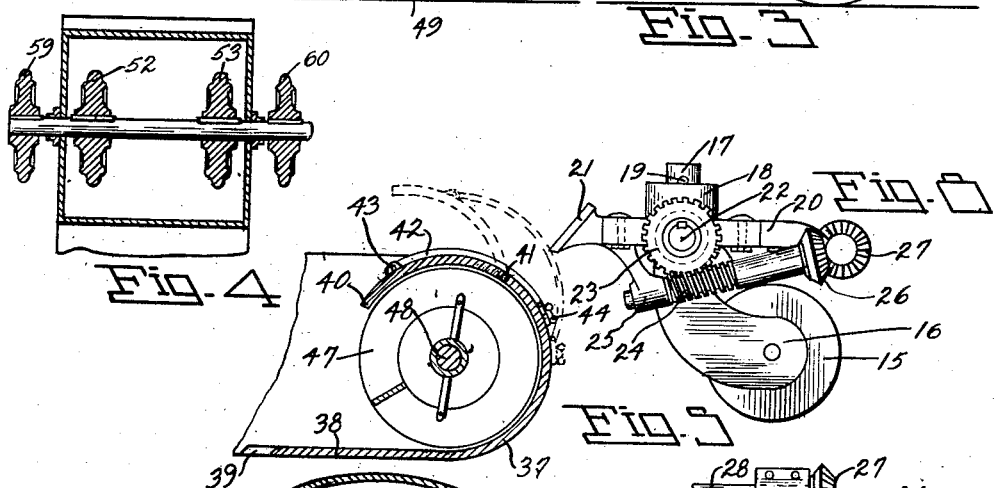
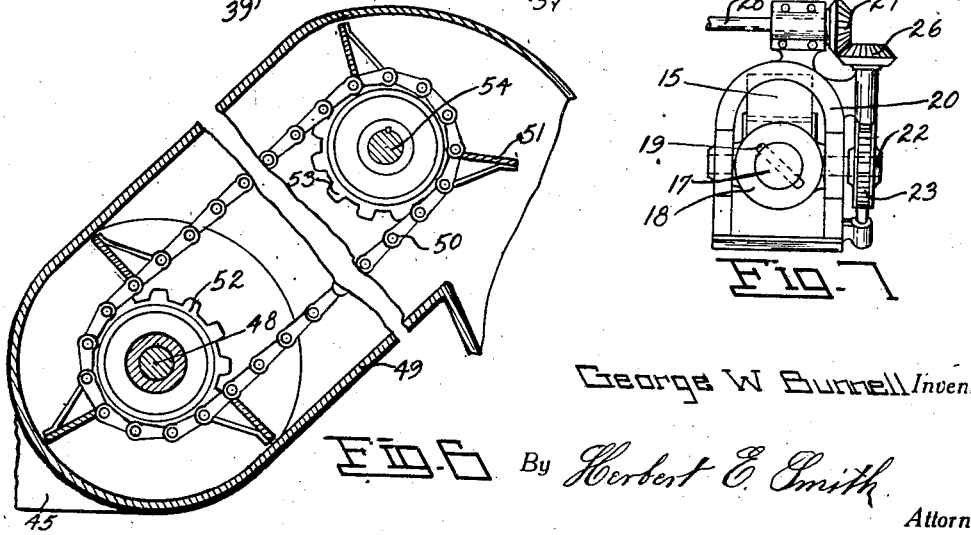
George W. Bunnell Inventor
By Herbert E. Smith
Attorney Patented Mar. 29, 1932

1,851,301

UNITED STATES PATENT OFFICE

GEORGE W. BUNNELL, OF SANTA, IDAHO

SNOW REMOVER

Application filed March 25, 1929. Serial No. 349,835.

My present invention relates to improvements in snow removers of the roadway-excavators type and mounted as a wheeled attachment at the front of an automotive vehicle, as a truck, for clearing the roads, streets, and highways of snow. In carrying out my invention I utilize an attaching frame for supporting the implement at the front of the vehicle and this frame has pivoted therein an adjustable and tiltable carrier-frame upon which are supported the excavators, conveyers and operating parts. The excavator is of the rotary screw type disposed transversely of the front of the vehicle and an upwardly inclined, longitudinal conveyor of the endless belt type is utilized for elevating and laterally delivering the snow at one or the other side of the road. Power, and operating means are carried upon the tiltable table or platform and manually operated means are utilized for tilting the table to adjust the implement with relation to the surface of the roadway, and for adjusting the position of the wheeled supports of the implement in accordance with the position of the implement.

The invention consists in certain novel combinations and arrangements of parts as will hereinafter be more fully set forth and claimed. In the accompanying drawings I have illustrated one example of the physical embodiment of my invention, wherein the parts are combined and arranged according to one mode I have thus far devised for the practical application of the principles of my invention.

Figure 1 is a top plan view of the implement, partly broken away for convenience of illustration, and attached at the front of an automotive vehicle. Figure 2 is an enlarged detail view of the manually operated means for tilting the implement. Figure 3 is a view in side elevation of the implement of Figure 1 on a reduced scale. Figure 4 is a transverse sectional detail view at line 4—4 of Figure 3. Figure 5 is a transverse sectional view at line 5—5 of Figure 1. Figure 6 is a sectional view at line 6—6 of Figure 1 parts being broken away for convenience of illustration. Figure 7 is a top plan view of a mount for one of the two caster wheels of the implement, and Figure 8 is a side view of the wheel and its mount.

As before stated, the implement is attached to an automotive vehicle, as a truck 1 having the usual wheels, one of the steering wheels being shown at 2, and the attaching frame of the implement includes a pair of side bars 3 and 4 of I-beams extending longitudinally at the front portion of the vehicle. These side bars are attached to the frame or chassis of the vehicle by the use of U-bolts 5 and plates 5' in suitable manner in order that the attaching frame may form a rigid and strong support for the carrier-frame 6 of the implement. The carrier frame comprises a number of longitudinally extending bars that are joined by transverse braces or bars to form a rigid structure and the frame is provided with a platform, table, or deck 7 of suitable length and width to accommodate one or more men as required. The frame and deck are hinged or pivotally supported on the attaching frame by means of transversely extending pin 8, and at the rear end of the carrier frame or tiltable frame are carried a pair of downwardly extending rack arms 9.

These rack arms are for use in tilting the frame and they co-act with a pair of pinions 10 on the transversely extending shaft 11, mounted in suitable bearings on the attaching frame, and provided with a crank handle 12 for turning the shaft and pinions. The rack arms are provided with a series of holes 13 and a selected one of these holes may be used with complementary holes in the attaching frame for the insertion of a bolt or bolts 14 which retain the tiltable frame in adjusted position. The front of the implement may thus be raised or lowered with relation to the surface of the roadway to be cleared in order to insure most efficient service of the implement.

The tiltable frame, in front of the hinge or pivot 8, is provided with a pair of caster wheels 15 that are spaced apart and swiveled to afford a broad bearing support for the tiltable frame and to facilitate the steering of the apparatus. The wheels are journaled in arms 16, and as best seen in Figures 7 and 8 the arms have a spindle 17 rigid therewith and projecting upwardly therefrom. A swivel head 18 is provided for the spindle and a cotter pin 19 is used in the spindle to prevent displacement of these parts.

Each swivel head is rigid with a U-shaped yoke 20 and each yoke has an attaching bracket 21 by means of which the wheel mount may be bolted to suitable portions of the tiltable frame. The swivel head 18 is fashioned with a pair of diametrically arranged trunnions 22 journaled in bearings of the yoke and one of the trunnions of each mount has a pinion 23 thereon. These pinions are turned, from the driver's seat of the vehicle, manually, for swinging the caster, its arms, and head with relation to the yoke, the latter being rigid with the tiltable carrier frame, and the wheels are thus adjusted to compensate for the changes in relation of the tiltable carrier frame to the road surface.

Each yoke supports a worm screw 24 journaled at 25 therein, and the worm screw of one wheel mount has a bevel gear wheel or pinion 26 that meshes with a complementary pinion 27 on the transversely extending shaft 28 that is journaled in suitable bearings supported from the yokes of the mounts. A bevel pinion 29 on this cross shaft is engaged by a complementary pinion 30 on the section 31 of an operating bar which may be integral with the worm screw of one of the mounts. The operating bar is made up of sections and universal joints as 32, and the sections 33 and 34 of the operating bar telescope as indicated in Figure 1 to permit adjustment of this sectional bar. At the rear end of the sectional operating bar a second universal joint 35 is provided and the bar may be turned by means of a hand wheel 36 located in position accessible to the driver of the vehicle.

At the front of the tiltable carrier frame is supported a transversely extending hood 37 which is fashioned with a bottom or horizontal plow or scraper 38 having front V-teeth 39 for engagement with the snow, or ice as the vehicle moves forward. To accommodate the hood to various depths of snow, the upper, front portion of the hood is fashioned as a hinged lid 40 having horizontal hinges 41 and a brace 42 hinged at 43. As indicated by dotted lines in Figure 5 the hinged lid may be raised, and in that position it is supported by the hinged brace, the lower free end of which is fastened by a keeper 44 on the rear of the main body of the hood.

At the opposite ends of the hood, and above the plow 38, are provided a pair of guards 45 that flare outwardly and forwardly of the plow to guide the snow into the hood, and at the left, forward side of the hood a second guard 46 is provided for pushing the snow laterally to the left as the vehicle advances.

Within the hood is carried a rotary screw conveyer or excavator 47 with its shaft 48 arranged transversely of the vehicle and journaled in suitable bearings of the hood. The rotary screw is designed to convey the snow through the hood to an upwardly extending housing 49 arranged at the left side of the implement and longitudinally of the vehicle. Within the housing is supported an endless belt or chain conveyer 50 having paddles or plates 51 to gather and elevate the snow from the hood to the upper end of the housing.

The endless chain conveyer or elevator passes around loose pulleys or sprockets 52 on the conveyer shaft 48, and over complementary sprockets 53 that are tight on the sprocket shaft 54 journaled in the upper end of the housing. The housing is provided with a discharge spout 55 that is swiveled at 56 so that the snow may be discharged to either side of the vehicle or otherwise directed from the housing.

The screw conveyer and the elevator are operated from a motor 57 of suitable type that is supported on the deck of the tiltable carrier frame, and the chain-drive 58—59 conveys the power from the motor to the shaft 54 for directly operating the housing elevator which has lower sprocket wheels loose on the screw conveyer shaft. The screw conveyer shaft 48 is driven directly from the jack shaft or operating shaft 54 by means of an outside sprocket wheel 60, chain 61 and the sprocket wheel 62 on the shaft 48, thus permitting the screw conveyer and the elevator to be driven at relatively different speeds for conveying and elevating the snow. The lower end of the chain 61 and the sprocket wheel 62 are protected from the snow by the guard 46 which directs the snow away from these parts as the implement advances. The motor 57 may be an electric motor or an internal combustion engine, or other means may be used for supplying the power to the two conveyers.

Having thus fully described my invention what I claim as new and desire to secure by Letters Patent is:—

1. The combination with an attaching frame of a hinged carrier frame, means for adjusting the carried frame and retaining means therefor, a hood mounted on the carrier frame and a plow projecting forward of the hood, said hood having a hinged lid and a brace for holding the lid in adjusted position, a rotary excavator supported within the hood, an endless elevator, and means for operating said excavator and elevator.

2. The combination with an attaching frame, of a tiltable carrier frame and means for retaining said frame in adjusted position, supporting wheels mounted under the carrier frame and means for adjusting said wheels to compensate for relative adjustment of the carrier frame, a hood at the front of the carrier frame and a screw conveyer therein, an endless upright elevator co-operating with the screw conveyer, a motor mounted on the carrier frame, driving connections from the motor to the elevator, and driven connections from the elevator to the screw conveyer, said driven connections being operated at different speed than the driving connections.

3. The combination with an attaching frame, of a tiltable carrier frame and a rack arm on said frame, a rack wheel on the attaching frame and a handle for said wheel, supporting wheels mounted under the carrier frame and means for adjusting said wheels to compensate for relative movement of the carrier frame, a hood at the front of the carrier frame and a screw conveyer therein, an endless upright elevator at the side of the carrier frame and co-operating with the screw conveyer, a motor on the carrier frame and driving connections therefrom to the elevator, and driven connections from the elevator to the screw conveyer whereby the latter is driven at different speed from the former.

In testimony whereof I affix my signature.

GEORGE W. BUNNELL.